(12) United States Patent
Faimali et al.

(10) Patent No.: US 12,145,827 B2
(45) Date of Patent: Nov. 19, 2024

(54) AUTOMATIC GUIDED VEHICLE FOR THE HANDLING OF SHUTTLES AND/OR LOADING UNITS IN AUTOMATIC WAREHOUSES AND RELATED CONTROL METHOD

(71) Applicant: OCME S.R.L., Parma (IT)

(72) Inventors: Annalisa Faimali, Fidenza (IT); Luigi Cerinelli, Parma (IT)

(73) Assignee: OCME S.R.L., Parma (IT)

( * ) Notice: Subject to any disclaimer, the term of this patent is extended or adjusted under 35 U.S.C. 154(b) by 503 days.

(21) Appl. No.: 17/447,967

(22) Filed: Sep. 17, 2021

(65) Prior Publication Data
US 2022/0089420 A1    Mar. 24, 2022

(30) Foreign Application Priority Data

Sep. 24, 2020  (IT) .................... 102020000022585

(51) Int. Cl.
*B66F 9/06*    (2006.01)
*B65G 1/137*   (2006.01)
(Continued)

(52) U.S. Cl.
CPC ............ *B66F 9/063* (2013.01); *B65G 1/1371* (2013.01); *B66F 9/0755* (2013.01); *B66F 9/125* (2013.01); *B66F 9/143* (2013.01); *B66F 9/146* (2013.01)

(58) Field of Classification Search
CPC ..... B66F 9/149; B66F 9/0755; B62B 2203/28
See application file for complete search history.

(56) References Cited

U.S. PATENT DOCUMENTS 4,869,635 A * 9/1989 Krahn ...................... B66F 9/063
                                                    414/667
5,052,882 A * 10/1991 Blau ....................... B66F 9/148
                                                    414/667
(Continued)

FOREIGN PATENT DOCUMENTS

DE        37 40 558 A1    7/1988
GB          805429 A     12/1958
(Continued)

OTHER PUBLICATIONS

Italian Search Report issued Jun. 9, 2021 in Italian Application 102020000022585 filed on Sep. 24, 2020, 3 pages (with English Translation of Categories of Cited Documents).

*Primary Examiner* — Mark C Hageman
(74) *Attorney, Agent, or Firm* — Oblon, McClelland, Maier & Neustadt, L.L.P.

(57) ABSTRACT

An automatic guided vehicle for the handling of shuttles and/or loading units in automatic warehouses. A telescopic upright integral with a vehicle frame bears a fork holder plate provided with a pair of forks and connected to the telescopic upright with an equipment. The equipment includes actuators and sensors for controlling and commanding the movements of the forks. An actuator controls the global lateral translation of the fork holder plate. A pair of actuators moves the forks closer to and away from each other. A pair of actuators rotates the fork holder plate with respect to a central axis of the equipment. The equipment also includes a pair of fork side sensors, to check the alignment of the fork holder plate to the front side of a rack and fork alignment sensors to check the alignment of the forks with respect to the lateral guides of the tunnel.

5 Claims, 10 Drawing Sheets

(51) Int. Cl.
*B66F 9/075* (2006.01)
*B66F 9/12* (2006.01)
*B66F 9/14* (2006.01)

(56) References Cited

U.S. PATENT DOCUMENTS

| | | | | |
|---|---|---|---|---|
| 7,219,769 | B2* | 5/2007 | Yamanouchi | B66F 9/0755 |
| | | | | 414/641 |
| 8,220,169 | B2* | 7/2012 | Goddard | B66F 9/0755 |
| | | | | 33/286 |
| 10,859,998 | B2* | 12/2020 | Marsee | B66F 9/24 |
| 2006/0245891 | A1* | 11/2006 | Flaherty | B66F 9/149 |
| | | | | 414/607 |
| 2013/0209203 | A1* | 8/2013 | Rafols | B66F 9/147 |
| | | | | 414/666 |

FOREIGN PATENT DOCUMENTS

| | | |
|---|---|---|
| GB | 1 366 245 A | 9/1974 |
| WO | WO 91/08164 A1 | 6/1991 |

* cited by examiner

AUTOMATIC GUIDED VEHICLE FOR THE HANDLING OF SHUTTLES AND/OR LOADING UNITS IN AUTOMATIC WAREHOUSES AND RELATED CONTROL METHOD

The present invention relates to an automatic guided vehicle for the handling of shuttles and/or loading units in automatic warehouses and a related control method.

Laser-guided vehicles, hereinafter also referred to alternatively as LGVs, are used to handle loading units, comprising loads or goods on pallets, in warehouses and storage areas as an alternative to manually operated forklifts.

Warehouses are generally equipped with racks comprising a plurality of vertical uprights, which can also reach considerable heights, such as up to 12 m, and a plurality of horizontal shelves arranged one above the other.

In order to optimise the operations of handling loading units within predefined areas without department operators, automatic guided vehicles are able to autonomously pick up a pallet and/or a load arranged in a particular area to transfer it and deposit it, still autonomously, in another predefined area, which can be identified on a shelf of a specific storage rack.

The shelves of these storage racks are suitably sized to allow placing pallets with goods and/or similar loads on the shelf.

In the case of automatic storage warehouses, the shelves are significantly deep, forming a so-called "tunnel", in particular capable of accommodating a plurality of aligned loading units. The shelves are made up of two "L" shaped lateral guides, to support the loading unit thereon and to accommodate within a precise seat a so-called shuttle, i.e. a motor driven carriage.

The shuttle is provided with its own drive motor means to travel through the tunnel longitudinally in depth and to lift its upper loading surface to pick up the pallet resting on the lateral guides and transfer it to the predefined position along the tunnel.

The main difficulties in these applications are the high precision that needs to be achieved in coupling shuttles/loading units and tunnels, and the high heights of the racks that imply further inaccuracies in the mechanical part of the vehicle.

At present, these critical aspects can be overcome by manually-guided vehicles, in which the operator can make the necessary corrections, including making progressive adjustments, but they still represent serious difficulties for automatically-guided vehicles.

The object of the present invention is to make an automatic guided vehicle for the handling of shuttles and/or loading units in automatic warehouses and a related control method capable of handling, with reliability and repeatability, both traditional pallet loading units and shuttles of the automatic warehouse requiring minimum tolerance ranges.

Another object of the present invention is to make an automatic guided vehicle for the handling of shuttles and/or loading units in automatic warehouses and a related control method capable of adapting to different tunnels.

Another object of the present invention is to make an automatic guided vehicle for the handling of shuttles and/or loading units in automatic warehouses and a related control method capable of maintaining the same performances when operating at heights.

Another object of the present invention is to make a particularly simple and functional automatic guided vehicle for the handling of shuttles and/or loading units in automatic warehouses and a related control method, with limited costs.

These objects according to the present invention are achieved by an automatic guided vehicle for the handling of shuttles and/or loading units in automatic warehouses and a related control method as set forth in claim 1.

Further features are provided in the dependent claims.

The features and the advantages of an automatic guided vehicle for the handling of shuttles and/or loading units in automatic warehouses and a related control method according to the present invention will be more apparent from the following description, which is illustrative and not limiting, referring to the accompanying schematic drawings in which:

FIG. 1 is a perspective view of an automatic guided vehicle for the handling of automatic warehouses according to the present invention;

FIG. 2 schematically shows a rack of an automatic warehouse wherein a shuttle and a loading unit, as well as a pair of forks, are shown;

Figure 9:
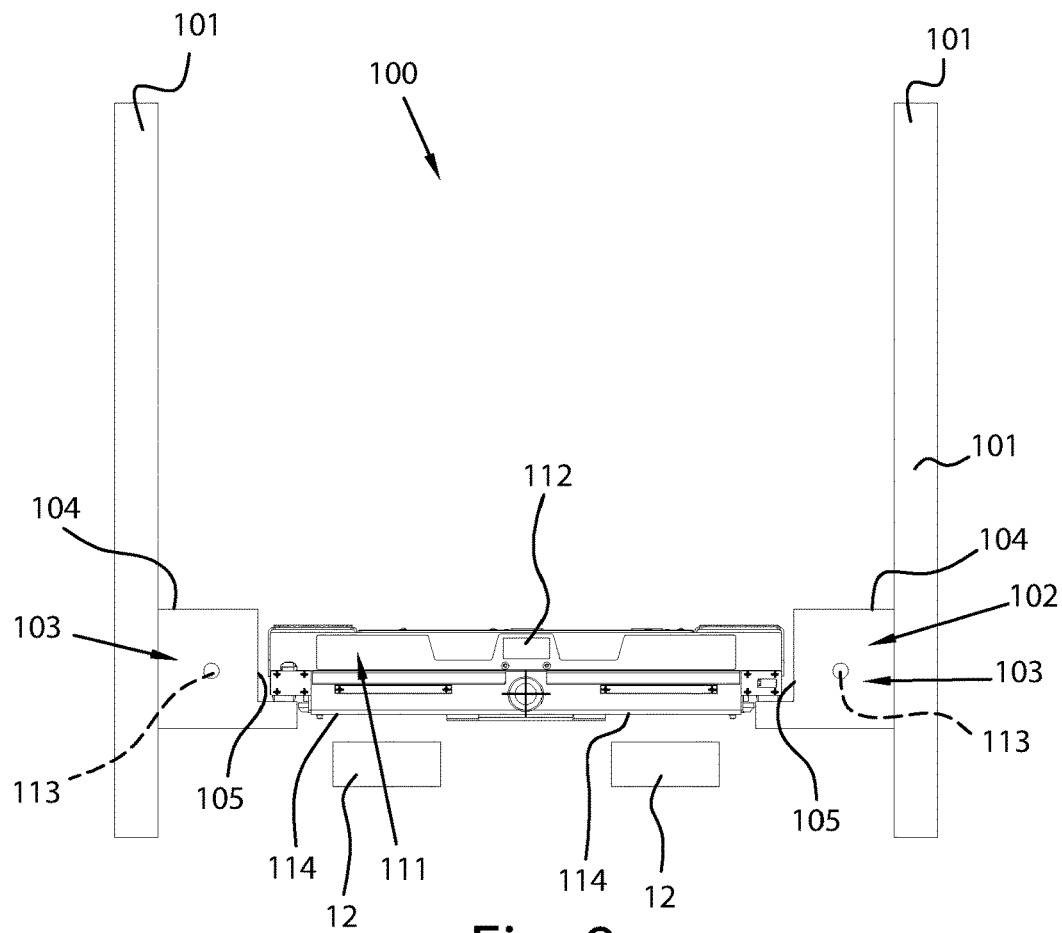
Figure 10:
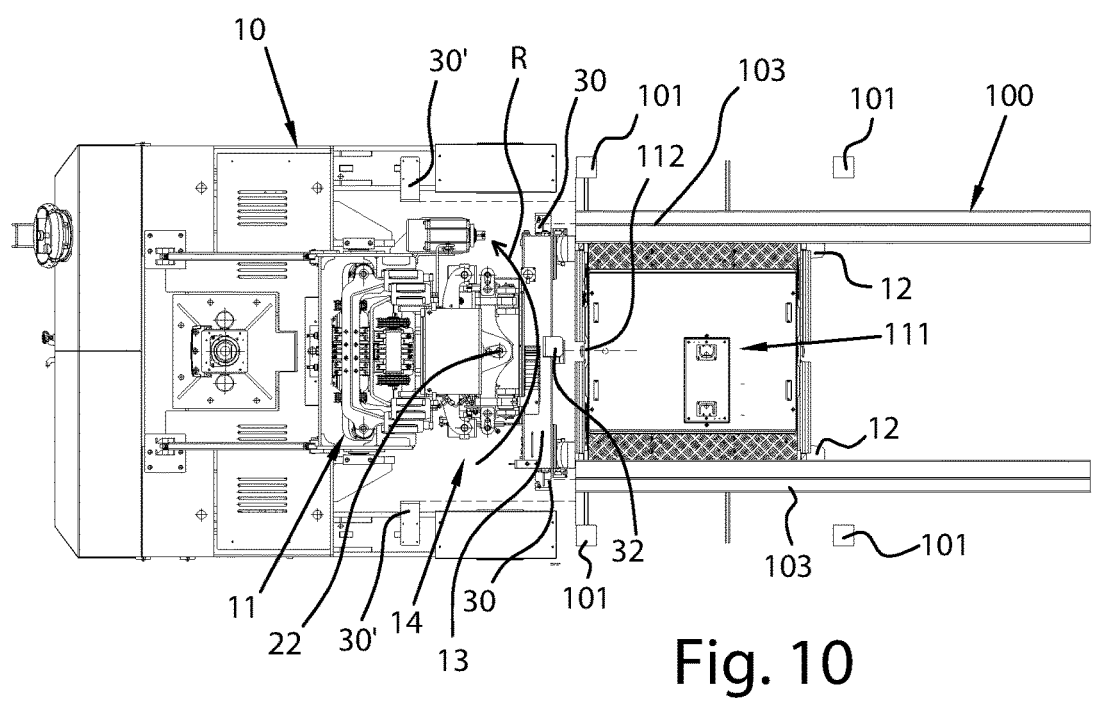
Figure 11:
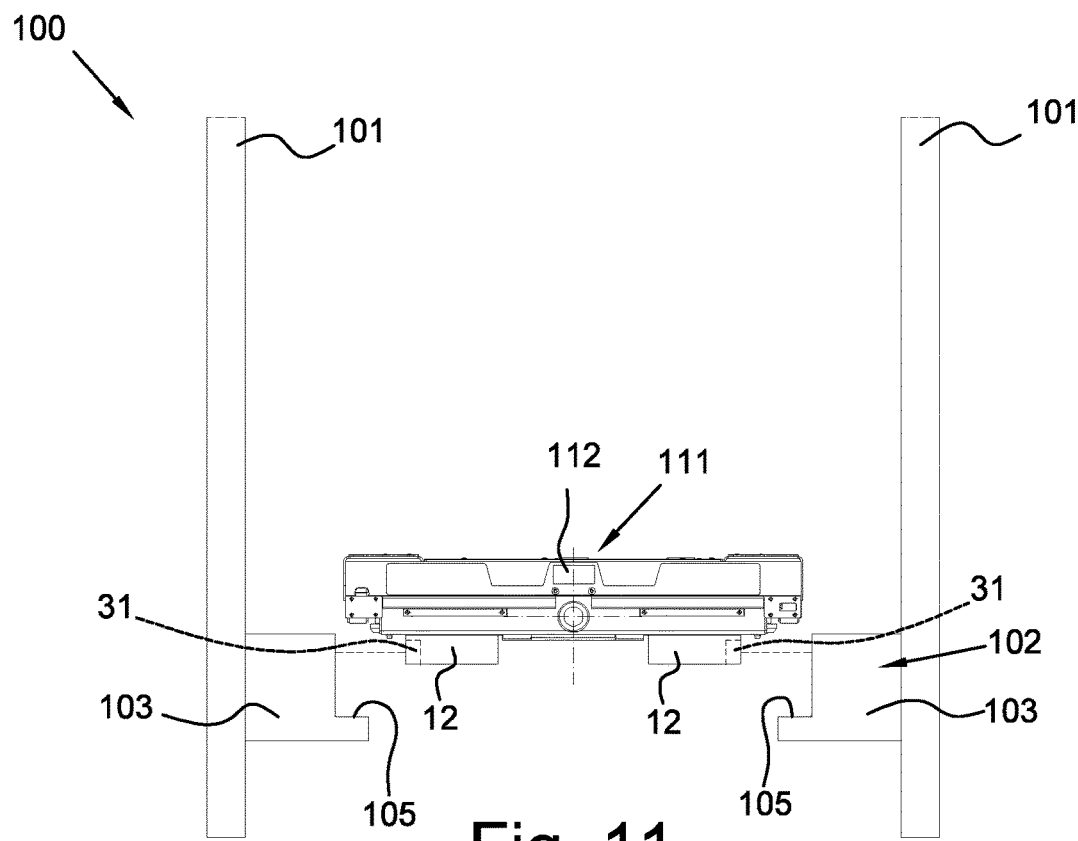
Figure 12:
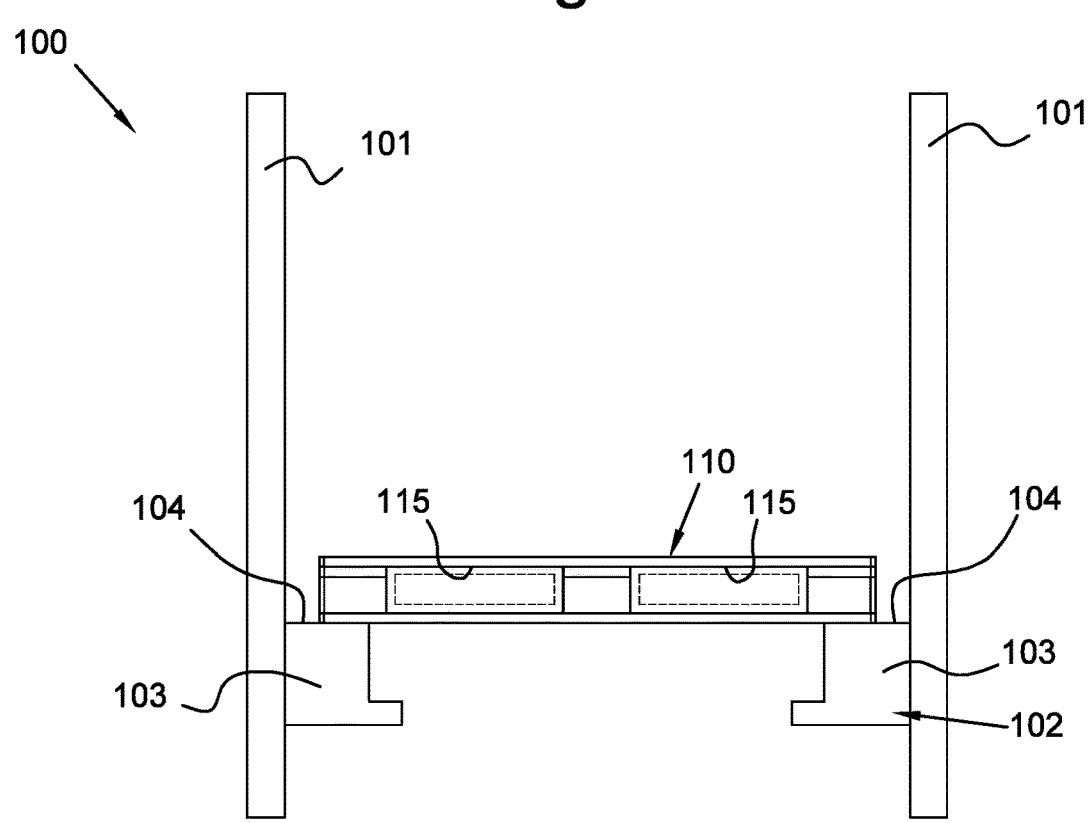

FIG. 9 schematically shows a rack of an automatic warehouse wherein a shuttle in a picking position is shown;

FIG. 10 is a plan view of a vehicle according to the invention during the picking cycle of a shuttle;

FIG. 11 schematically shows a rack of an automatic warehouse during the picking cycle of a shuttle;

FIG. 12 schematically shows a rack of an automatic warehouse wherein a loading unit in a picking position is shown.

With reference to the figures, an automatic guided vehicle for handling automatic warehouses, indicated as a whole by 10, is shown.

Figure 1:
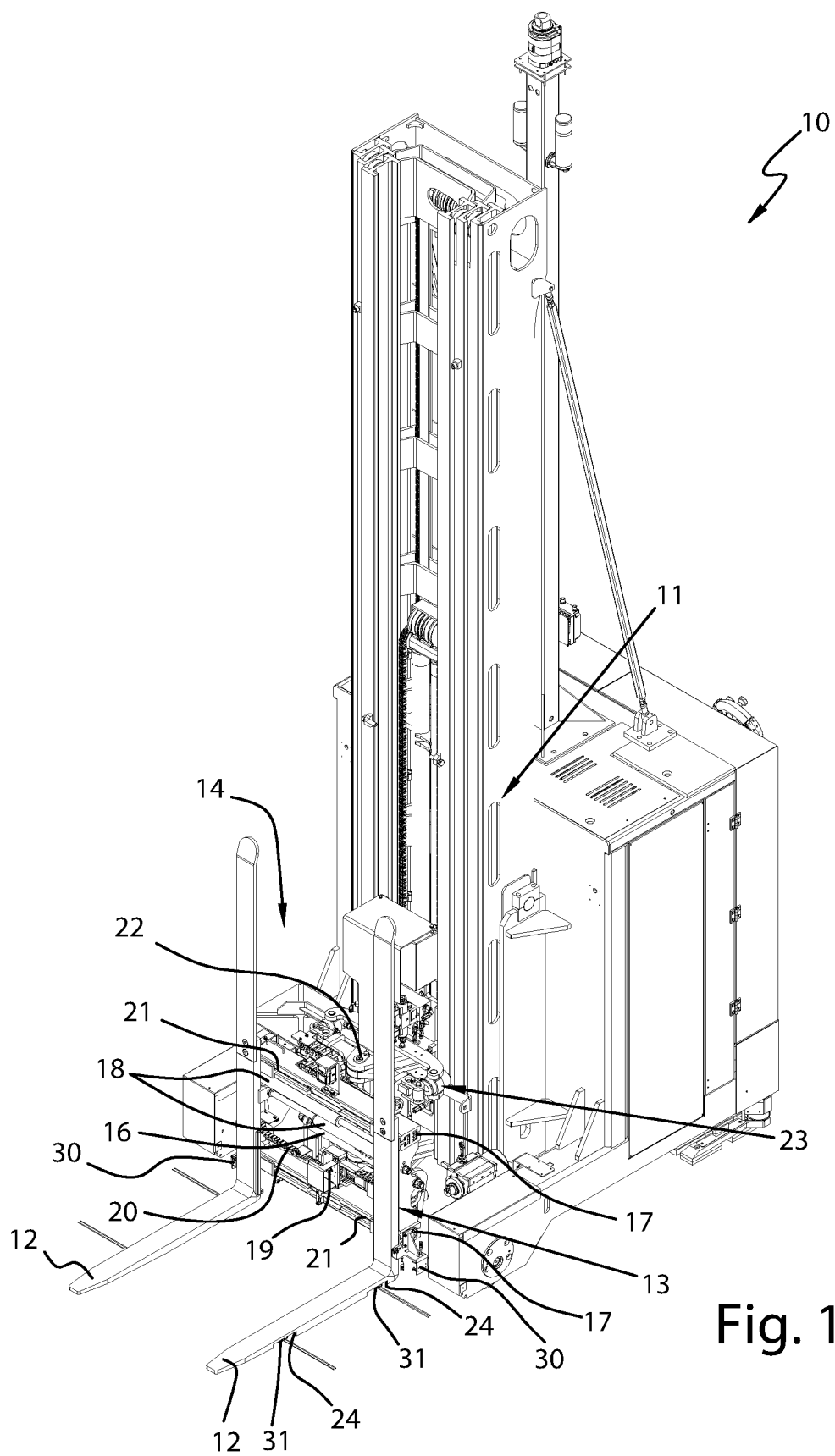

The automatic guided vehicle 10 comprises a telescopic upright 11 integral with a vehicle frame 10 and bearing a fork holder plate 13 provided with one or more pairs of forks 12 (FIG. 1).

Figure 2:
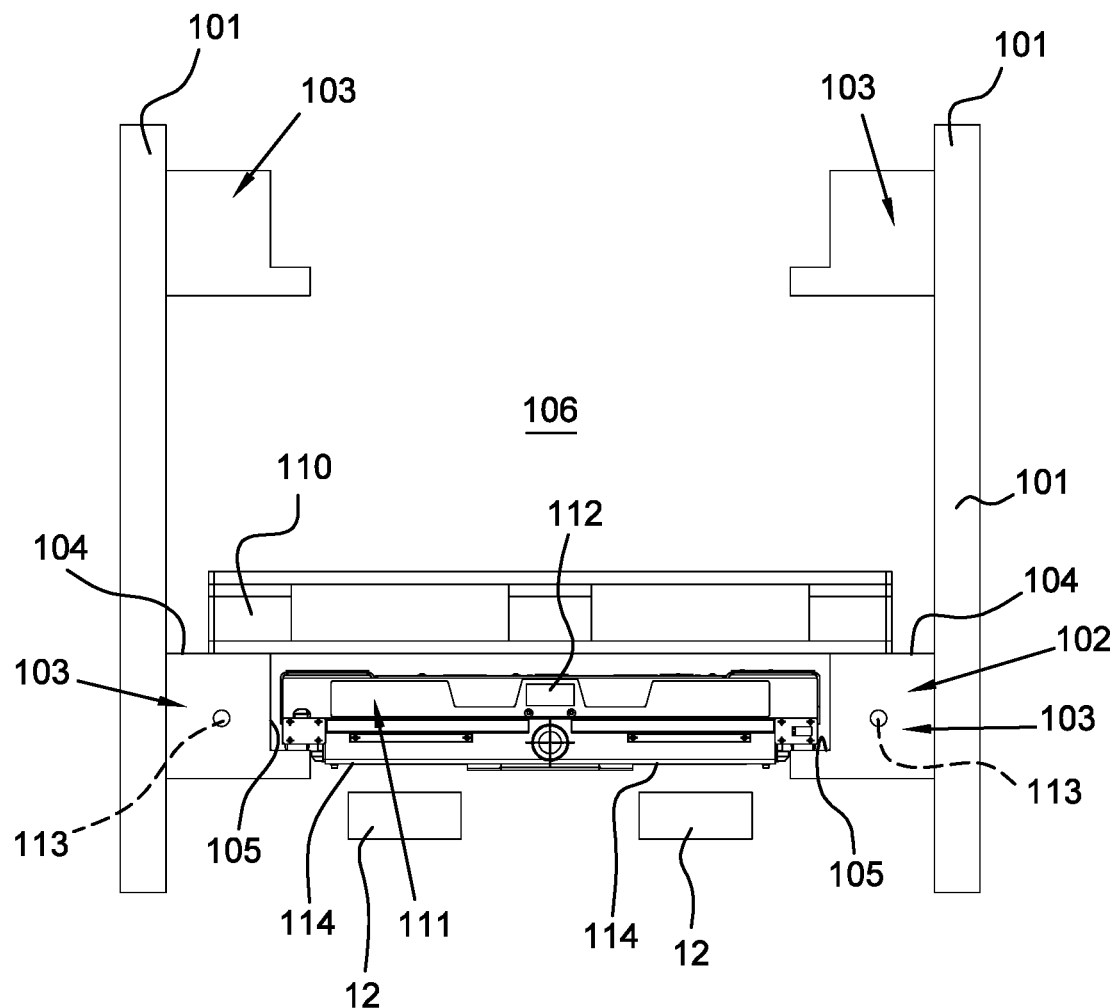

An automatic warehouse comprises racks 100 provided with a plurality of vertical uprights 101 and a plurality of horizontal shelves 102, arranged one above the other. The shelves 102 consist of a pair of "L" shaped rectilinear guides 103, comprising an upper plane 104 for supporting a loading unit 110, a so-called pallet, and a precise seat 105 to accommodate a shuttle 111 of the automatic warehouse. Each of the two lateral guides 103 is provided at the front with a plane surface adapted to be detected by the sensors (FIG. 2).

In the figure, a sensor reading point 113 is shown for exemplary purposes, placed at the centre of each of the front plane surfaces of the lateral guides 103.

Each shelf 102 identifies a tunnel 106 having a certain depth, adapted to accommodate a plurality of pallets 110, which is run by the shuttle 111 for moving the pallet 110 to a storage position.

The shuttle 111 must be provided, on at least one of the sides along the travel directions, with a reflector 112, which enables the vehicle 10 to search for it.

Means 114 for coupling and locking the shuttle 111 and the forks 12 may also be provided on the bottom of the shuttle 111, for example for a magnetic coupling and/or a coupling by means of mechanical guides, to ensure a stable fixed positioning between the shuttle 111 and the forks 12 in particular during the transport on board the vehicle, for example when moving from one aisle of the warehouse to another.

Between the fork holder plate 13 and the upright 11 an equipment 14 is interposed, which controls the essential movements of the forks 12, i.e. the tilting of the fork holder plate 13, the global translation of the fork holder plate 13, the symmetrical positioning of the forks 12 and the rotation of the fork holder plate 13 with respect to the centre of the equipment 12. The equipment 14 comprises a plurality of actuators and associated support plates, as well as a plurality of sensors to detect the position of the forks 12 and control said essential movements of the forks 12.

Figure 3:
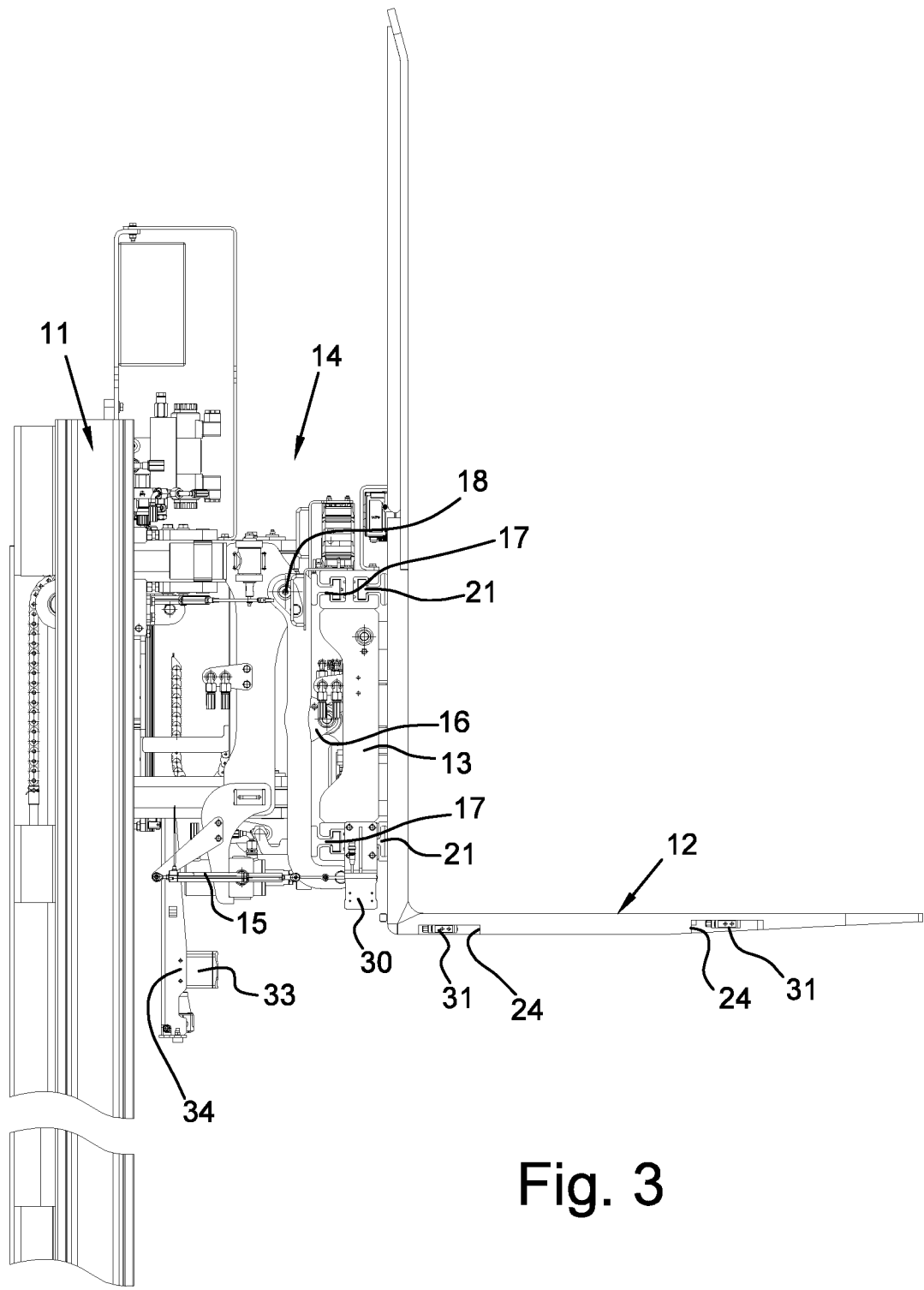
FIG. 3 shows a detail of the upper end of the telescopic upright bearing the equipment, the fork holder plate and the forks.

The equipment 14 comprises a pair of actuators 15, preferably cylinder actuators, shown in FIG. 3, assembled at opposite sides of the fork holder plate 13 and acting on a plane orthogonal to the fork lifting plane 12, identified by the telescopic uprights 11, to change the inclination of the forks 12 relative to the ground. The tilting movement is used to recover the flexion of the forks 12 when high-mass loads are transported. In fact, with heavy loads (e.g. around 1000 kg), enables the forks to be placed horizontally 12 in relation to the ground, and therefore in relation to the tunnels 106.

Figure 4:
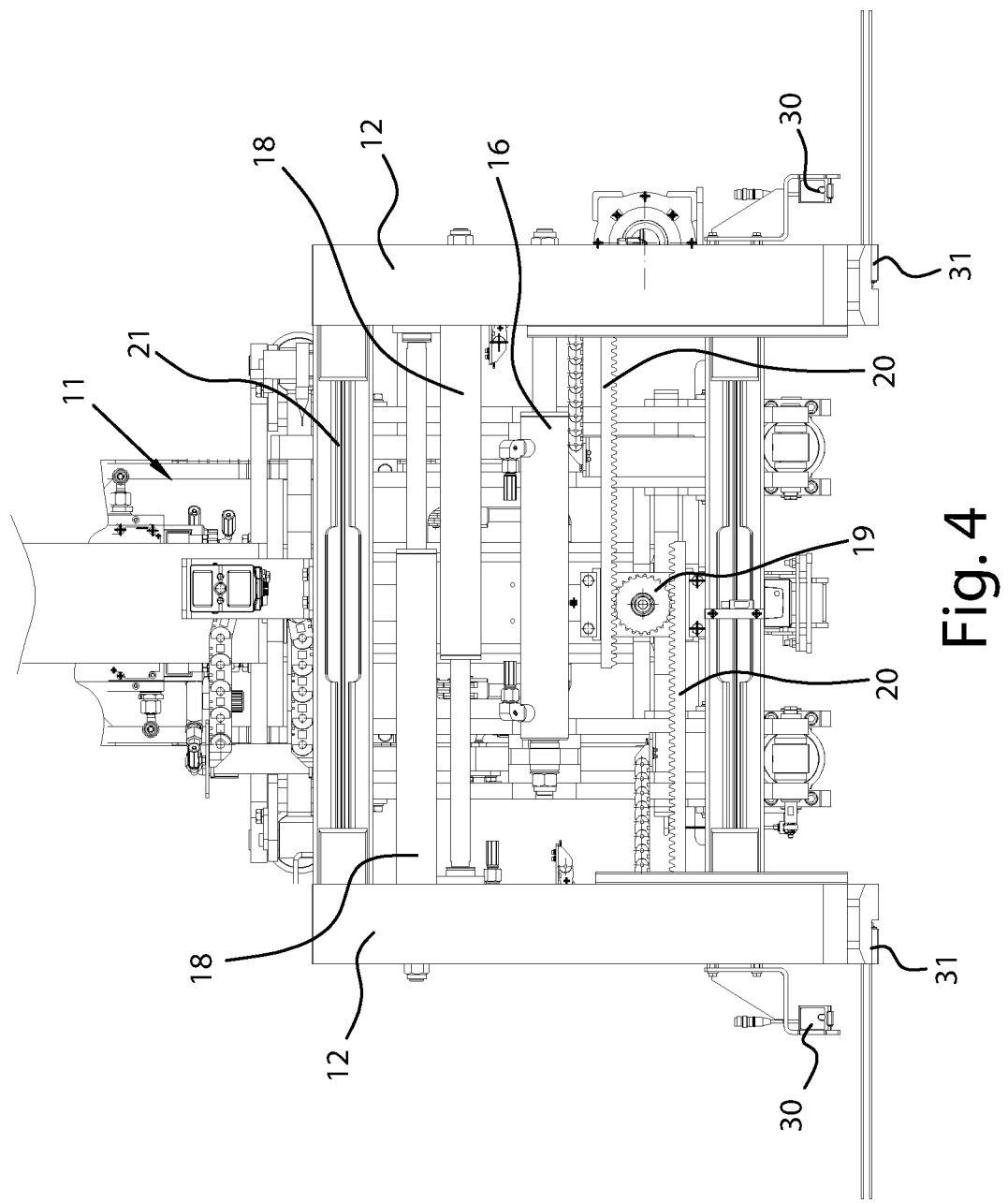
FIG. 4 is a partial front view of the fork holder plate bearing the forks.

The equipment 14 comprises an actuator 16, preferably a cylinder actuator, connected between the upright 11 and the fork holder plate 13, to control the global translation of the fork holder plate 13 laterally along straight guides 17 in the fork lifting plane 12 (FIG. 4).

The equipment 14 also comprises a pair of actuators 18, preferably cylinder actuators, each connected between the upright 11 and a respective fork 12, for moving the forks 12 closer to and away from each other on the lifting plane of the forks 12.

According to an embodiment shown in the figures, by way of example but not limited thereto, the two forks 12 are mechanically connected by means of a pinion 19 and a rack 20 so that the forks move towards and away from each other with a perfectly symmetrical positioning. Alternatively, the symmetrical positioning can be obtained by an independent movement of the forks.

The translation movement of the individual forks 12 relative to the fork holder plate 13, when moving towards and away from each other, takes place along straight guides 21, which are parallel to each other and lying on the fork lifting plane.

Figure 5:
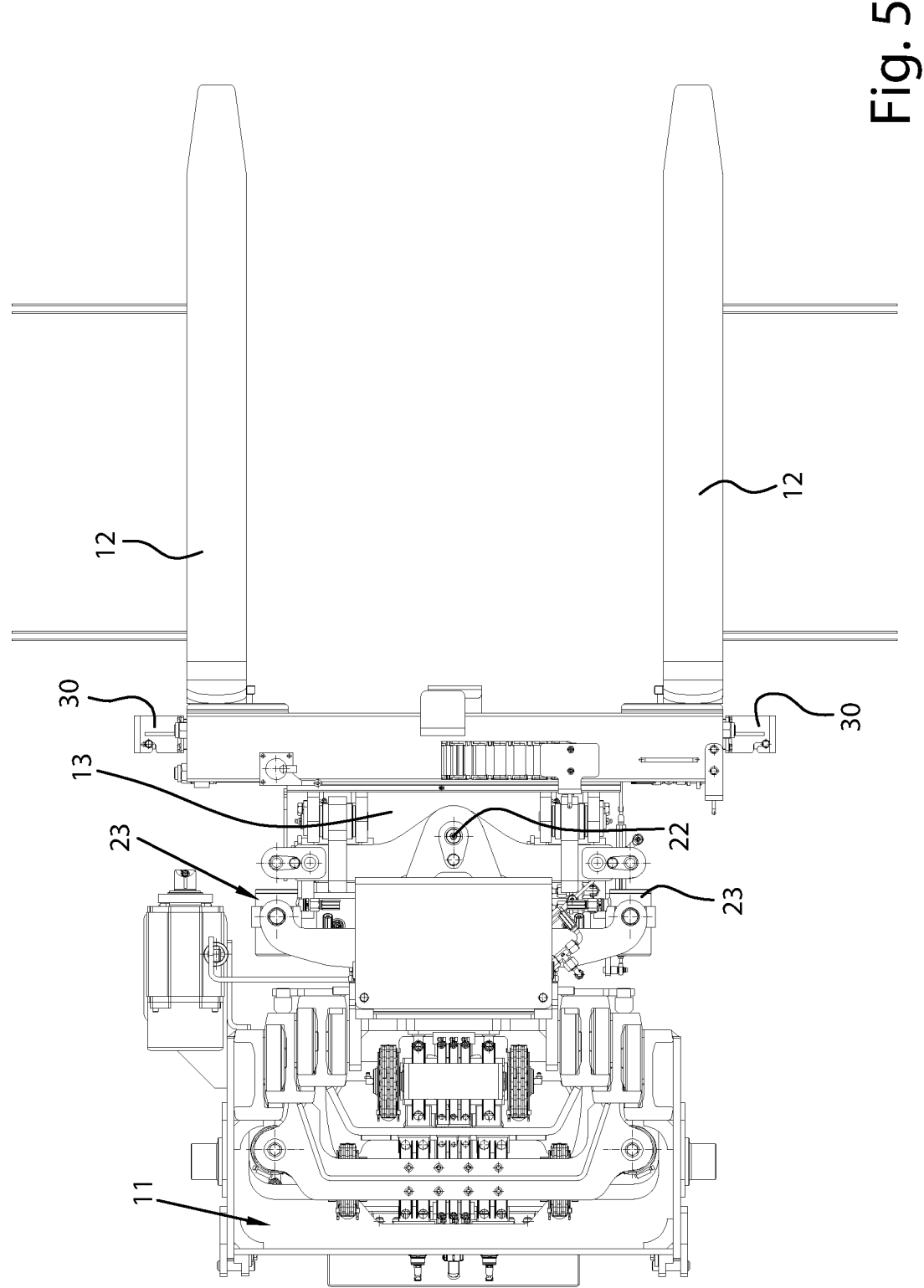
FIG. 5 is a partial view from above of the fork holder plate bearing the forks.

The rotation of the fork holder plate 13 relative to a central axis 22 of the equipment 14, arranged vertically, i.e. parallel to the telescopic upright 11, is controlled by a pair of actuators 23, preferably cylinder actuators, acting on opposite sides of the fork holder plate 13 in a plane orthogonal to the lifting plane of the forks 12 (FIG. 5). This adjustment is used to ensure that the fork holder plate 13 is coplanar with the front side of the rack 100 of the automatic warehouse to correct alignment errors.

The automatic guided vehicle 10 also includes at least a pair of fork side sensors 30, 30', placed externally with respect to them, to check that fork holder plate 13 is aligned to the front side of the rack 100 and, if necessary, to correct the alignment error through the rotation of the fork holder plate 13 around the central axis 22.

Each pair of side sensors 30, 30' preferably consists of one or more sets of laser distance measuring photocells.

The vehicle 10 according to the invention is provided with at least one pair of side sensors 30 installed on board the forks 12 and therefore movable in height with them, shown for example in FIGS. 1 to 6, and preferably also with a pair of side sensors 30' installed on board a frame of the vehicle 10 (FIG. 7) in a position fixed in height. According to a particular embodiment, which is not shown, the at least one pair of side sensors 30, movable in height, comprises two pairs placed at a predetermined vertical distance from each other and possibly adjustable to allow a better detection of the lateral guide 103 of the rack 100 regardless of the handling of loading units 110 or shuttles 111 and depending on the geometry of the rack 100 and of the loading units 110 to be handled.

Also the choice of whether to use the side sensors 30, movable in height, or the height-fixed side sensors 30' close to the ground is also made on the basis of the geometry of the rack 100 and the loading units 110 to be handled.

The pairs of side sensors 30, 30' can also be inclined according to the geometry of the rack 100 and the loading units 110 to be handled.

The side sensors 30, 30' measure the distance between the fork holder plate 13 and the front surface of the lateral guide 103 of the rack 100 facing it to calculate the angle of the fork holder plate 13.

Directly on each fork 12, on the lower side thereof, there are at least two seats 24 that are open towards the external side of the forks 12 and housing an equal number of fork alignment sensors 31 to control the alignment of the forks 12 with the lateral guides 103 of the tunnel 106. These are preferably laser distance measuring photocells.

According to the preferred embodiment shown in the figures, there are two photocells for each fork 12.

The photocells 31 emit laser beams, schematically shown in the figures with two thin lines for each photocell 31 when they are in a position already inserted in the rack 100. By measuring the distance between each of the forks 12 and the respective lateral guide 103 of the rack 100 at two separate points on each fork 12, they can detect the exact position of the forks 12 in the tunnel 106 both in terms of alignment with respect to the lateral guides 103 and in terms of centering with respect to them.

By means of the fork alignment sensors 31, it is possible to control both the angle corrections of the fork holder plate 13 and the lateral positioning of the forks 12 and the fork holder plate 13.

Figure 6:
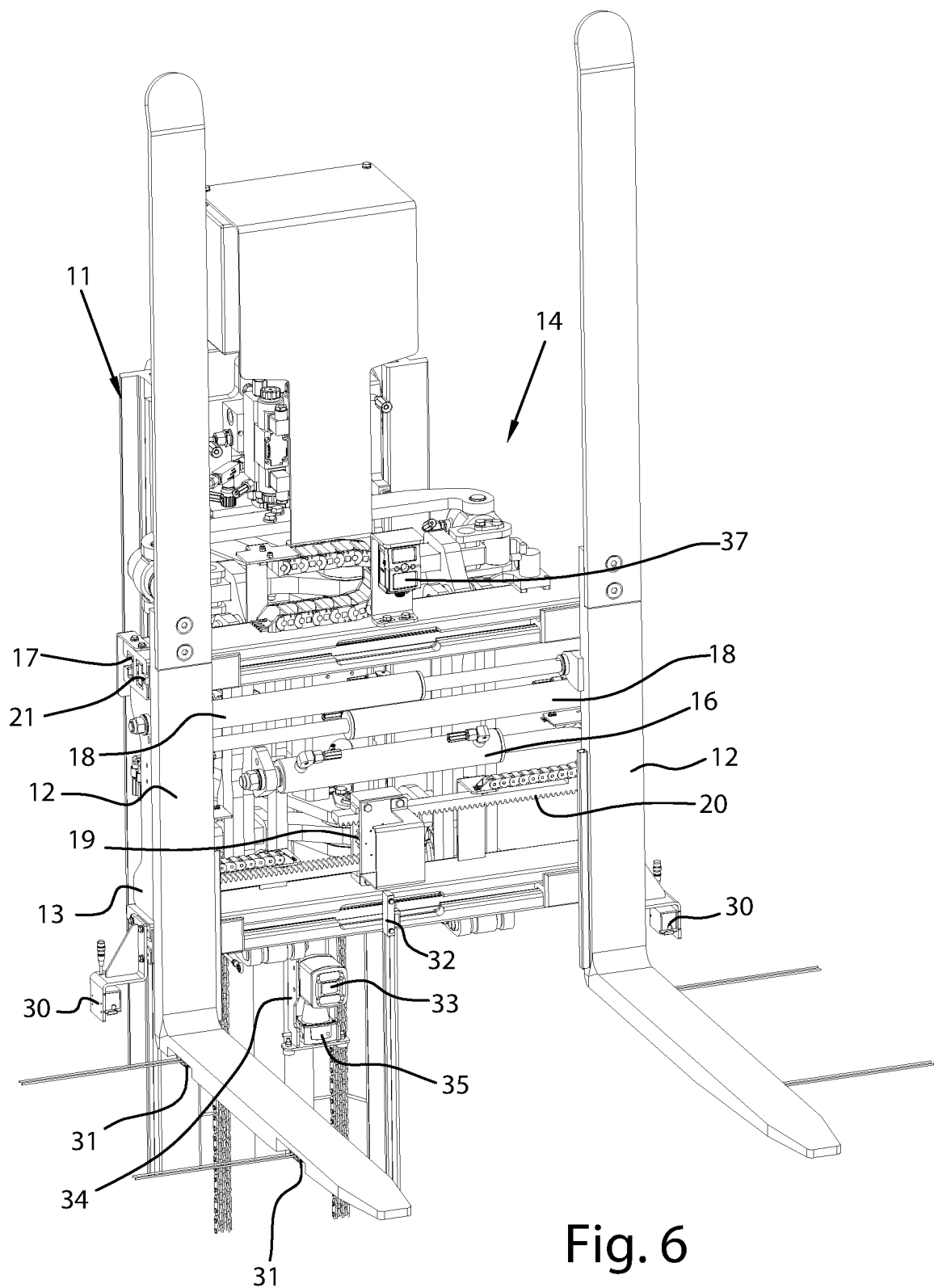
FIG. 6 is a partial perspective view of the fork holder plate bearing the forks.
Figure 7:
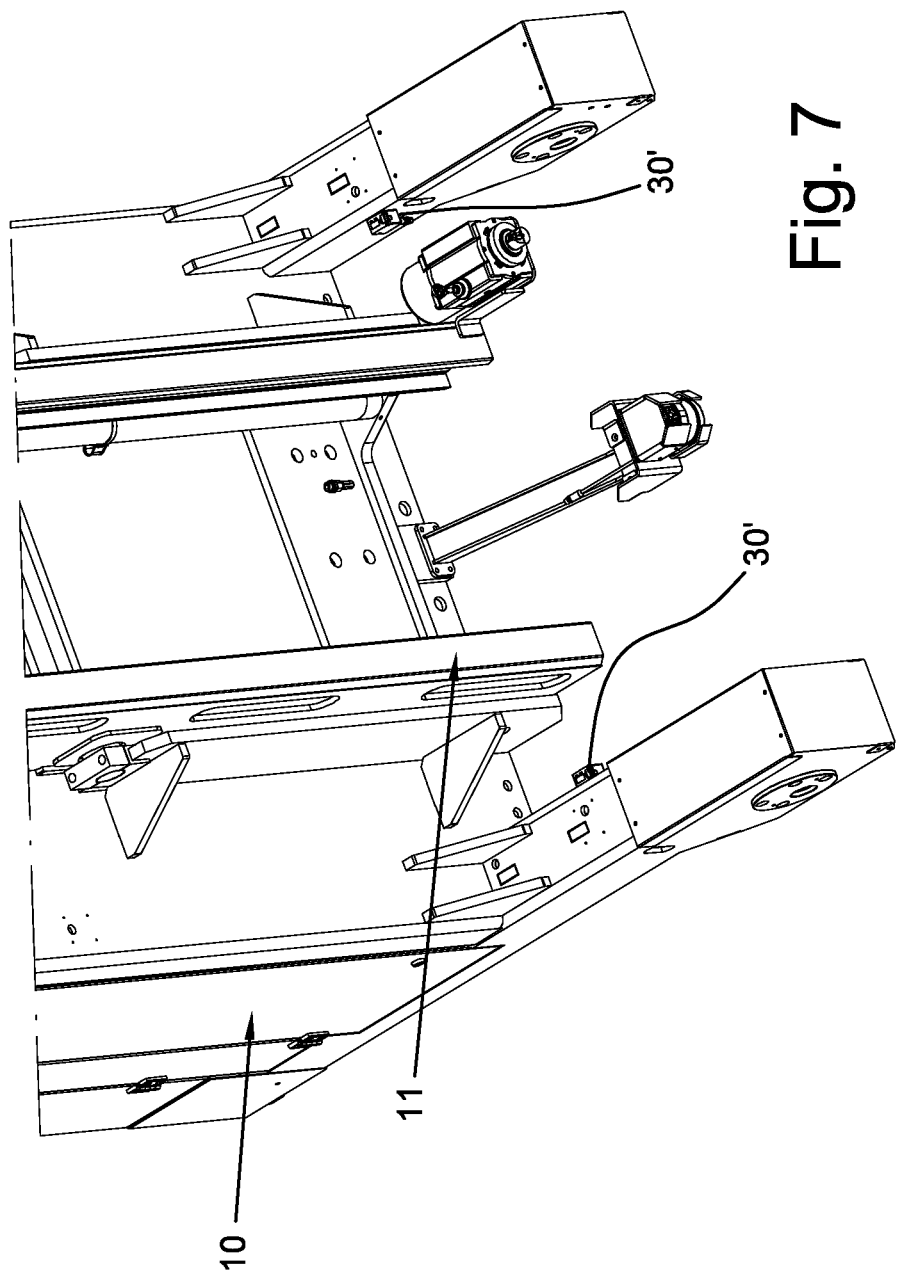
FIG. 7 shows a detail of the pair of fork side sensors placed on the vehicle frame.

In the central part of the fork holder 13 a sensor for searching for shuttle 32 is shown (FIG. 6). This is preferably a polarised reflection photocell capable of detecting the reflector 112 positioned on the shuttle 111 and defining the exact mutual position between the shuttle 111 and the forks 12, which is necessary for picking the empty shuttles 111 from the rack 100.

The automatic guided vehicle 10 also comprises a camera 33, preferably 3D, for recognising the profile of the pallet 110, operating in known ways, to detect the position of holes 110' of the pallet 110 wherein the forks 12 are to be positioned. The camera 33 is positioned on a support 34, which places it below the forks 12 and which is movable in height along with it (FIG. 6).

The automatic guided vehicle 10 also comprises an empty space verification sensor 35, which performs, in known ways, a programmable scan to check the presence of an empty location suitable for the storage of a loading unit. It is preferably a laser measuring device, positioned on the mobile support 34, which places it underneath the forks 12.

Known sensors (encoders) are also installed on board the equipment 14 of the automatic guided vehicle 10 to measure the position of the equipment 14 at all times. In particular, the following positions should be detected:

Height of the forks 12 from the ground,
Side translation height of the whole fork holder plate 13,
Height of the horizontal position of the forks 12,
Tilting angle of the fork holder plate 13,
Angle of rotation of the fork holder plate 13.

Figure 8:
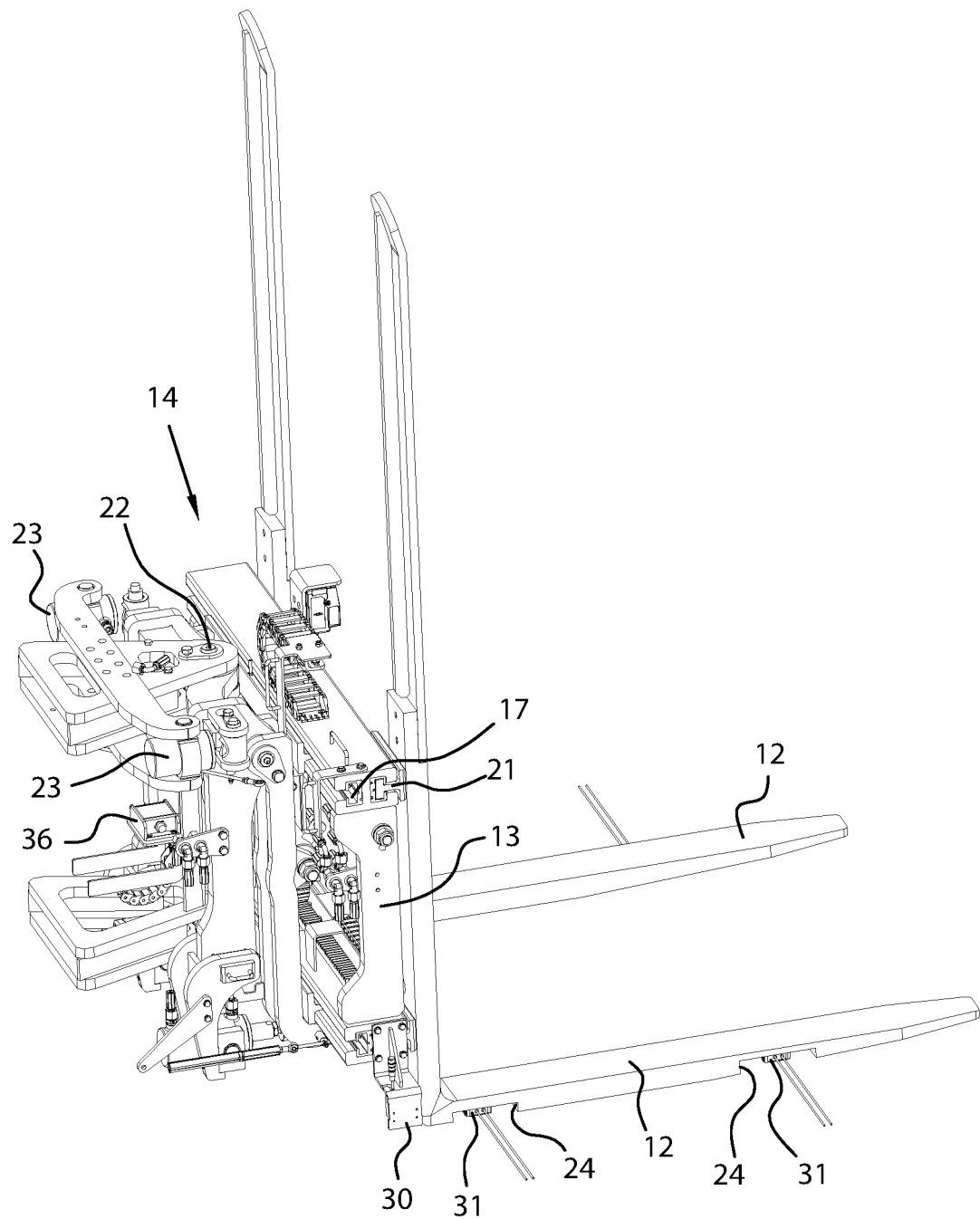
FIG. 8 shows a detail of the fork holder plate bearing the forks separated from the telescopic upright.

Furthermore, the automatic guided vehicle 10 according to the invention comprises an inertial platform 36, comprising three accelerometers, gyroscopes and an inclinometer, placed on board the equipment 14, for detecting the oscillations and the inclination of the equipment relative to the ground in known ways (FIG. 8). When the inertial platform 36 detects an oscillation of the forks 12, e.g. after lifting the forks 12 along the height, it prevents a picking or loading cycle from starting until the detection of the oscillation stops. Similarly, it will prevent a picking or loading cycle from starting if it detects an excessive inclination of the forks 12 relative to the ground, i.e. the inclination of the vehicle 10 relative to the ground. A control on the start of the loading and unloading cycles is thus implemented so that they can be carried out with the highest possible precision without introducing external errors.

The automatic guided vehicle 10 also comprises, in known ways, a barcode reader 37 to carry out the traceability of the loading units, identifying through an optical device the label of the loading unit. The barcode reader 37 is positioned at the front of the fork holder structure 13 so that its reading field is suitable for the loading unit label (FIG. 6).

The automatic guided vehicle 10 according to the invention performs four different types of handling operations:

a) picking a shuttle 110 from a tunnel 106 of the rack 100,
b) depositing a shuttle 110 in a tunnel 106 of the rack 100,
c) picking a loading unit 110 from a tunnel 106 of the rack 100,
d) depositing a loading unit 110 in a tunnel 106 of the rack 100.

For all the described handling operations, the automatic guided vehicle 10 according to the invention is placed, in a known way by the laser guide system of the vehicle, which has the plant as a reference, in a so-called "target position", i.e. in a position with the forks 12 inserted in the tunnel 106 at a height suitable for the picking/depositing operation to be performed.

All the handling operations of the equipment 14 are controlled by the vehicle software, in a currently known way, through the sensors measuring the position of the equipment 14 at all times.

According to the invention, the method of handling automatic warehouses by means of an automatic guided vehicle, requires for all the four mentioned types of handling operations to align the equipment 14 and the forks 12 to each single tunnel 106 for each picking or depositing operation taking advantage of the pair of side sensors 30, 30', placed at the sides outside the forks, as well as the sensors 31 for controlling the alignment of the forks 12 with the lateral guides 103 of the tunnel 106, placed on the lower side of the forks 12, housed in seats 24 open towards the outside of the forks 12.

The cycle of picking a shuttle 111 from a tunnel 106 of a rack 100 (cycle a)) comprises the following steps:

The vehicle 10 travels along the penultimate segment towards the rack 100 with the forks 12 at a height suitable for picking the shuttle 111 and the fork holder plate in a centred position with respect to the central axis 22 of the vehicle 10, which is the default position.

In proximity of the target position, the vehicle 10 verifies, by means of the empty space verification sensor 35, that there is no loading unit 110 at the picking point.

If the shuttle 111 is suitable for picking, the vehicle 10 arrives at the target position with forks 12 inserted in the rack and stops (FIG. 9).

The vehicle 10 checks, in a known way, by the inertial platform 36, whether the inclination and oscillations of the equipment 14 relative to the ground are suitable for the operation. If so, the picking procedure continues.

By means of one or more pairs of the fork side sensors 30, 30', the distance is measured between the pairs of side sensors 30, 30' and the rack 100 at the lateral guides 103 at both sides of the forks 12. Any misalignment of the fork holder plate 13 with respect to the rack 100 is thus detected and, if necessary, the fork holder plate 13 is rotated about the central axis 22 to align it perfectly with the rack 100 according to the arrow R (FIG. 10).

Using the shuttle search sensor 32, which controls the translation of the fork holder plate 13, the reflector 112 located on board shuttle 111 is searched. Thereby, the forks 12 will be perfectly centred with the shuttle axis 111.

The shuttle 111 is then lifted by raising the vertical height of the forks 12 to lift it from its position in the seat 105 of the lateral guides 103 (FIG. 11).

Fork alignment sensors 31 are used to check the alignment of the forks/equipment with the guides 103 of the tunnel 100. If the position is suitable, the picking operation can be completed. Otherwise, the forks 12 are lowered and the shuttle 111 is temporarily deposited in the seat 105, then the rotation of the fork holder plate 13 is used to correct the misalignment detected, and the operation of picking the shuttle 111 is resumed and completed.

By rotating the fork holder plate 13, if necessary, it is possible to align the shuttle axis 111 to the vehicle 10, which can then proceed with the handling.

The cycle of depositing a shuttle 111 in a tunnel 106 of a rack 100 (cycle b)) comprises the following steps:

The vehicle 10 travels along the penultimate segment towards the rack 100 with the forks at a height suitable for depositing the shuttle 111, and the fork holder plate 13 in a centred position with respect to the axis 22 of the vehicle 10, which is the default position.

In proximity of the target position, the vehicle 10 checks, by means of the empty space verification sensor 35, that there is no loading unit 110 at the picking point.

If the tunnel 106 is suitable for the deposit, the vehicle 10 arrives at the target position and stops.

The vehicle 10 checks, in a known way, by the inertial platform 36, whether the inclination and oscillations of the equipment 14 relative to the ground are suitable for the operation. If so, the picking procedure continues introducing the forks 12 into the tunnel 106 between the lateral guides 103 (FIG. 11).

By means of one or more pairs of fork side sensors 30, 30' the distance between the equipment 14 and rack 100 is measured. The fork holder plate 13 is rotated accordingly to align it perfectly with the rack 100 itself.

By means of the fork alignment sensors 31, the alignment of the forks 12 with the lateral guides 103 is measured.

The fork holder plate 13 is translated and rotated accordingly to place the shuttle 111 in a position perfectly aligned and centred with the tunnel guides 103.

The shuttle 111 is then deposited on the lateral guides 103 by lowering the vertical height of the forks 12.

The picking cycle of a loading unit 110 in a tunnel 106 of a rack 100 (cycle c)) comprises the following steps:

The vehicle 10 travels along the penultimate segment towards the rack 100 with the forks 12 at a height suitable for picking up the loading unit 110, and the fork holder plate 13 in a position centred with respect to the central axis 22 of the vehicle 10, which is the default position.

The vehicle 10 checks, in a known way, by the inertial platform 36, whether the inclination and oscillations of the equipment 14 relative to the ground are suitable for the operation. If so, the picking procedure continues.

By means of the camera 33, in a known way, gaps 115 for the entry of the forks 12 into the pallet 110 are accurately identified, as schematically shown with a dotted line in FIG. 12. By means of the translation of the fork holder plate 13 and the positioning of the two forks 12 constituting the at least one pair of forks, the latter are positioned in the position suitable for picking the loading unit 110.

Then the vehicle 10 travels the last segment and arrives at the target and stops.

By means of the pair of side sensors 30, 30' the distance between the equipment 14 and the rack 100 is measured, and the fork holder plate 13 is rotated to align it perfectly with the rack 100 itself (FIG. 10).

Subsequently, the vehicle 10 completes the operation of picking the loading unit 100 by raising the vertical height of the forks 12.

The loading unit 100 is brought back into alignment with the vehicle 10, by translating the fork holder plate 13, if necessary.

The cycle of depositing a loading unit 110 in a tunnel 106 of the rack 100 (cycle d)) comprises the following steps:

The vehicle 10 travels along the penultimate segment towards the rack 100 with the forks 12 at a height suitable for depositing the loading unit 110, and the fork holder plate 13 in a position centred on the axis 22 of the vehicle 10, which is the default position.

In proximity of the target position, the vehicle 10 checks, by means of the empty space verification sensor 35, that there is no other loading unit 110 at the deposit point.

The vehicle 10 checks, in a known way, through the inertial platform 36, whether the inclination and oscillations of the equipment 14 with respect to the ground are suitable for the operation. If so, the picking procedure continues.

If the tunnel 106 is suitable for the deposit, the vehicle 10 arrives at the target and stops.

The distance between the equipment 14 and the rack 100 is measured by means of the pair of side sensors 30, 30', and the fork holder plate 13 is rotated to align it perfectly with the rack 100 itself.

Subsequently, the vehicle 10 completes the operation of depositing the loading unit 110 by lowering the vertical height of the forks 12 to deposit the loading unit 110 on the upper plane 104 supporting the lateral guides 103.

The automatic guided vehicle for the handling of shuttles and/or loading units in automatic warehouses and a related control method object of the present invention has the advantage of precisely correcting errors of alignment of the fork holder plate with the front of the warehouse as well as errors of alignment of the lateral guides within the forks, allowing shuttles to be picked and deposited in a precise and repeatable manner.

The automatic guided vehicle for the handling of shuttles and/or loading units in automatic warehouses and a related control method thus conceived is susceptible to several modifications and variants, all of which fall within the scope of the invention; furthermore, all the details can be replaced by technically equivalent elements. In practice, the materials used, as well as the dimensions thereof, can be of any type according to the technical requirements.

The invention claimed is:

1. An automatic guided vehicle for the handling of shuttles and/or loading units in automatic warehouses, the automatic warehouses include a plurality of vertical uprights carrying a plurality of opposite "L" shaped side guides to accommodate a unit load and/or a shuttle, the vehicle comprising:
a vehicle frame;
a telescopic upright integral with the vehicle frame;
equipment; and
a fork holder plate provided with at least one pair of forks and connected to the telescopic upright by way of the equipment,
wherein the equipment includes a plurality of actuators for controlling movement of the forks,
wherein the equipment further includes an actuator for controlling the global lateral translation of the fork holder plate, at least one pair of actuators for moving the forks towards and away each other, a pair of actuators for rotating the fork holder plate with respect to a central axis of the equipment,
wherein the vehicle also includes at least one pair of fork side sensors, placed externally with respect to the forks, to check the alignment of the fork holder plate to the front side of a rack and fork alignment sensors to check the alignment of the forks with respect to lateral guides of a tunnel,
wherein a fork alignment sensor is housed in each of the at least one pair of forks.

2. The automatic guided vehicle according to claim 1, wherein the at least one pair of fork side sensors includes at least one pair of side sensors, movable in height, installed on board of the forks, and a pair of side sensors fixed in height installed on board of a vehicle frame.

3. The automatic guided vehicle according to claim 2, wherein the at least one pair of side sensors movable in height includes two pairs of sensors placed at an adjustable vertical distance between them.

4. The automatic guided vehicle according to claim 1, wherein the pair of actuators for the rotation of the fork holder plate with respect to the central axis of the equipment acts on opposite sides of the fork holder plate in an orthogonal plane with respect to the lifting plane of the forks.

5. The automatic guided vehicle according to claim 1, wherein the equipment further comprises a shuttle sensor for searching for a shuttle located in the central part of the fork holder plate, a camera for the recognition of the profile of the pallet of the loading unit and an empty space verification sensor to verify the presence of an empty station suitable for the deposit of a loading unit positioned on a support under the forks, an inertial platform for measuring the oscillations and inclination of the equipment with respect to the ground, a barcode reader to carry out the traceability of loading units.

\* \* \* \* \*